United States Patent [19]

Ramsauer et al.

[11] 4,385,724
[45] May 31, 1983

[54] APPARATUS FOR CONTROLLING THE WATER TEMPERATURE OF A SPA

[75] Inventors: Larry R. Ramsauer; Ronald M. Scholer, both of San Jose, Calif.

[73] Assignee: Ramco Manufacturing, Inc., San Jose, Calif.

[21] Appl. No.: 252,438

[22] Filed: Apr. 9, 1981

[51] Int. Cl.³ .......................... F22B 35/00; F24H 1/00
[52] U.S. Cl. ...................................... 236/25 A; 4/545; 126/362; 236/94
[58] Field of Search ...................... 236/25 A, 20 R, 32, 236/94, 99 J, 99 R; 219/312; 4/545, 598; 126/362

[56] References Cited

U.S. PATENT DOCUMENTS

| | | | |
|---|---|---|---|
| 1,450,444 | 4/1923 | McGuire | 4/545 |
| 2,830,164 | 4/1958 | Weber et al. | 236/20 UX |
| 2,923,797 | 2/1960 | Thelen | 236/20 X |
| 3,029,026 | 4/1962 | Eskin | 236/32 |
| 3,075,702 | 1/1963 | Pappas | 236/32 |
| 3,351,956 | 11/1967 | Thoner | 219/362 |

Primary Examiner—William E. Wayner
Attorney, Agent, or Firm—Richard Alan Brown

[57] ABSTRACT

An improved temperature sensing and control apparatus for a spa is described, which control apparatus is located at the spa. A switching means is disposed in the series electrical circuit of a water heating mechanism. The switching means is remotely controlled as a function of the water temperature and operates in the low voltage and low current range, thereby minimizing a safety hazard.

4 Claims, 4 Drawing Figures

APPARATUS FOR CONTROLLING THE WATER TEMPERATURE OF A SPA

BACKGROUND OF THE INVENTION

1. Field of the Invention

This invention generally relates to an improvement in temperature control devices for a spa or hot tub and is more particularly directed to an arrangement for a remote temperature control device which senses the water temperature and allows control thereof directly at the spa or hot tub.

2. Prior Art

In the past, most prior art devices for controlling the water temperature of a spa (also called hot tubs) place the thermostat at some distance from the spa. In some instances air activated switches have been used near the spa. However, these switches do not sense or control the true spa water temperature but simply turn equipment "on" and "off".

The prior art methods have the disadvantage that these thermostats do not accurately sense the true spa water temperature and have an approximate four degree Fahrenheit differential at a given setting between heater "on" and heater "off" condition. This four degree range is somewhat uncomfortable and certainly noticeable to the user of the spa.

Another disadvantage under the prior art method of controlling the spa water temperature is that it requires the user to get out of the spa to adjust the heater thermostat.

Yet another disadvantage of the prior art spa heating systems is that the temperature adjustment mechanisms are not calibrated beyond "low", "medium" and "high" settings.

The above disadvantages of prior art devices can result in the user of the spa allowing the spa water to reach an excessively high temperature. Physical injury to the spa user and deaths have occurred as a result of the spa water being too hot and the inconvenience of resetting the temperature.

SUMMARY OF THE INVENTION

In a water heating apparatus for heating water in a spa and having a heating means coupled to a source of energy through an energy switch wherein water is moved through a line from the spa to close proximity of the heating means, wherein the improvement comprises, a switching means having an operating arm, the switching means being disposed for operating the energy switch, a heat sensing means disposed in the water to be heated, a circuit means coupled between the heat sensing means and the switching means, the circuit means including means for adjusting the operating range of the heat sensing means, whereby the heat sensing means and the means for adjusting both being located at the spa.

An alternate embodiment is a gas-fired water heating apparatus for heating water in a spa and having a gas burner coupled to a source of gas through a gas valve wherein a pressure switch is disposed in a water line from the spa to a pump moving the water in proximity to the gas burner, and having a series electrical circuit formed of a gas valve, a pressure switch and a thermocouple, and wherein an improved apparatus is provided which comprises, a switching means having an operating arm, a common and normally closed terminal thereof wherein the switching means is disposed for interrupting the series electrical circuit. The apparatus further includes a heat sensing bulb containing a heat expanding fluid therein being immersed in the spa water, a mechanical transducer fluidically coupled to the heat sensing bulb by means of a capillary tube wherein the piston of the transducer is mechanically coupled to the operating arm of the switching means and a means for adjusting the position of the operating arm of the switching means disposed so as to change the switching point of the switching means, the means for adjusting being located at the spa.

It is an advantage of the present invention to provide a spa temperature control system that senses the true water temperature in the spa and a spa temperature control system that is located at the spa.

Another advantage of the present invention is that it allows for the accurate control of the temperature of the water in the spa, regulating spa water temperature to within plus or minus one-half a degree Fahrenheit.

A further advantage of the present invention is that it does no use AC power at the temperature control unit located in the area of the spa as utilizing AC power would create a danger of electrocution.

BRIEF DESCRIPTION OF THE DRAWINGS

In the drawings forming a part of specification, and wherein like reference numerals are employed to designate like parts throughout the same.

DETAILED DESCRIPTION

Figure 1:
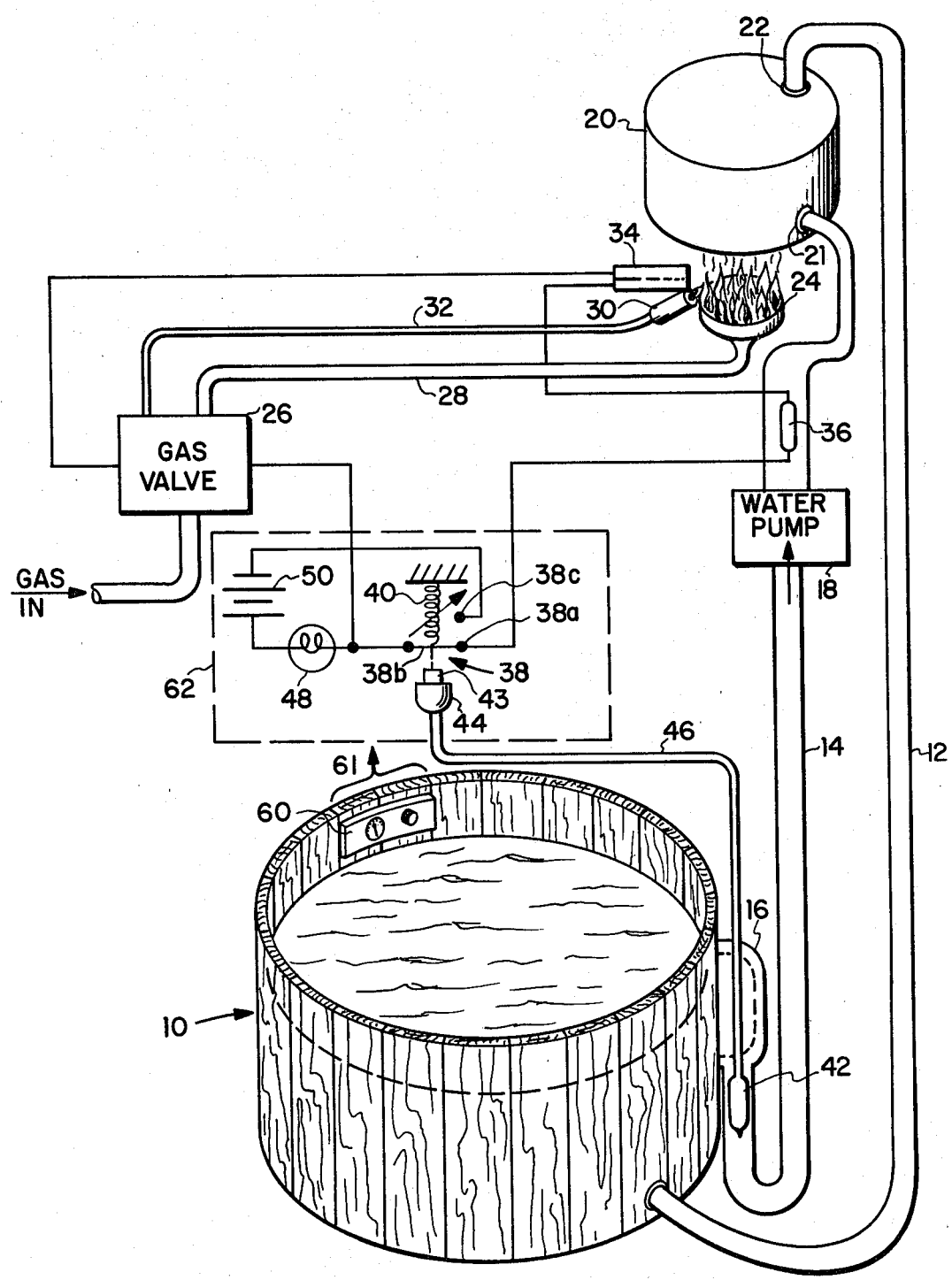
FIG. 1 is a diagram of the present invention as used with a spa.

Referring now to FIG. 1, a diagram of the present invention is illustrated adjacent a spa 10 having a water intake line 12 coupled to the bottom of the spa and a water outlet line 14 coupled to a skimmer 16 disposed adjacent the surface of the water in the spa 10. A pump 18 moves water from the spa 10 at the skimmer 16 through the line 14 to a water heating apparatus 20, with an inlet 21 coupled to the water line 14, and with an outlet 22 coupled to the water intake line 12 which returns the water back to the hot tub 10. The water in the apparatus 20 is heated by means of a gas burner 24 disposed adjacent thereto, which gas burner is supplied through a gas valve 26 by means of a gas line 28. Pilot light 30 is used for igniting the burner 24 and is coupled to the gas valve 26 by means of a gas line 32. Alternatively, an electric ignition heating mechanism may be employed. The gas valve 26 is controlled by means of a series electrical circuit comprising a thermocouple 34, a pressure switch 36, and switch (or relay) 38. Heat from the pilot light 30 causes the thermocouple 34, which thermocouple is disposed adjacent to the pilot light, to generate a small electrical current (within the milliamp range) which current passes through pressure switch 36 when water is moving through the pump 18 and to normally closed contact 38a of switch 38. Operating arm 38b of switch 38 is held in a normally closed position by an adjustable biasing means or spring 40 (described further hereinafter). Thus, the current passes through switch 38 to one side of the gas valve 26 thereby operating the valve so as to allow gas to be supplied to the burner 24.

In accordance with this invention a heat sensing bulb 42 is disposed in the water return line 14. The heat sensing bulb 42 is fluidically coupled to a mechanical transducer 44 by means of a capillary tube 46. Bulb 42 contains a heat expanding fluid which when heated operates the transducer 44, which overcomes the biasing means 40 to transfer the operating arm 38b of the switch 38 to the normally open contact 38c. This action breaks the electrical current to the gas valve 26 thereby shutting off the gas to the burner 24.

Heat sensing bulb 42 may be disposed in the spa water at other locations such as in the water of the spa 10, or in the skimmer 16 or in the water outlet line 14. In order to insure proper operation of the invention, the bulb 42 must be totally immersed in the spa water.

An electrical circuit including an indicating means 48 is coupled in series between the operating arm 38b of the switch 38 through a source of voltage 50 to the normally open contact 38c of the switch 38. Accordingly, when the operating arm 38b of the switch 38 is transferred to the normally open contact 38c indicating means 48 is turned on, which indicates that the temperature in the spa 10 has reached the desired temperature.

The control panel 60 is shown built into the inside surface of the spa 10. Panel 60 may be located at any other convenient location near the spa 10 such as the side of the spa, a deck near the spa or the lip area of the spa. Bracket 61 and the adjacent arrow as shown in FIG. 1 represents that the control panel 60 incorporates those components outlined by the dashed line 62, referred to hereinafter as control circuitry.

Figure 1A:
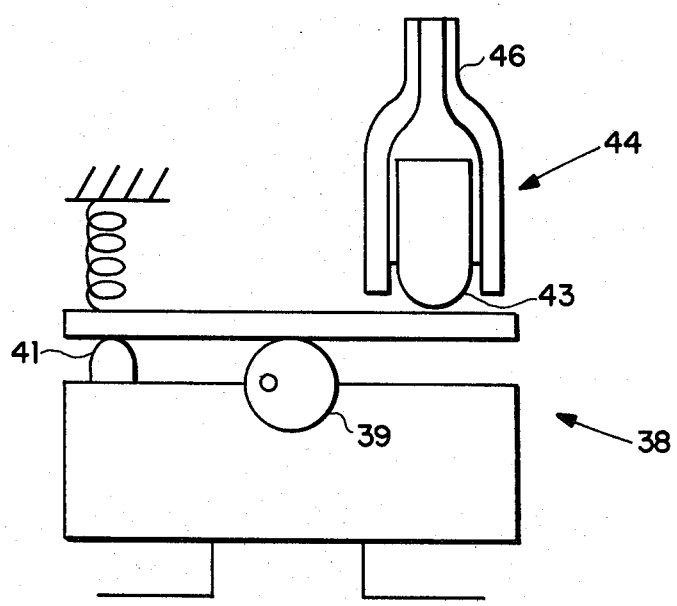
FIG. 1a is a diagram of a portion of FIG. 1, wherein use of a microswitch is illustrated.

Referring now to FIG. 1a, a portion of the embodiment illustrated in FIG. 1 is shown wherein a microswitch is utilized for the switch 38. Briefly, expansion of the fluid in the capillary tube 46 drives the piston 43 of the transducer 44 against the operating arm 37 to operate the microswitch 38. Rotation of the cam 39 changes the position of the operating arm 37 relative to the switch actuator 41 so that the operating arm 37 is closer or farther away from switching the microswitch 38 as a result of movement of the piston 43. Accordingly, the operating range of the microswitch 38 is changed as a function of the angular position of the cam 39.

Figure 1B:
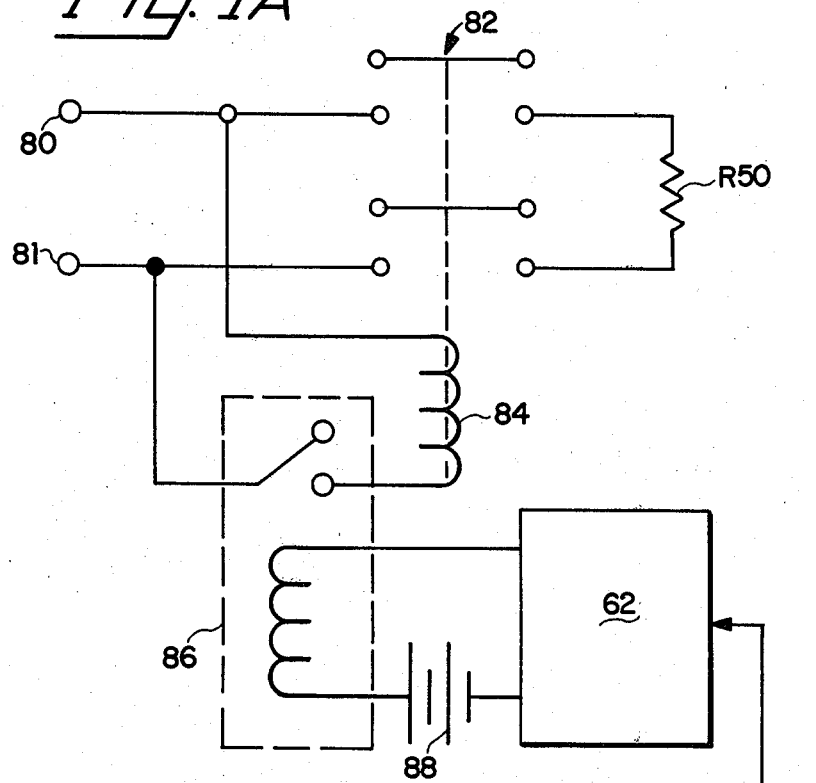
FIG. 1b is a schematic diagram of an alternate embodiment of this invention.

Referring now to FIG. 1b, a schematic diagram of an alternate embodiment of the invention as employed in an electrical heating apparatus. Line voltage is supplied on terminals 80 and 81 coupled to a power relay 82. Resistor R50 represents the heating element of the heating apparatus. Coil 84 of the relay 82 is coupled in parallel with the power line, with the terminals of a second control relay 86 interrupting power to the coil 84. The coil of the relay 86 is operated by the same control circuitry 62, as described hereinabove, in combination with a low voltage source 88. The control circuitry 62 is operated in response to the heat sensing bulb 42 as described hereinabove.

Figure 2:
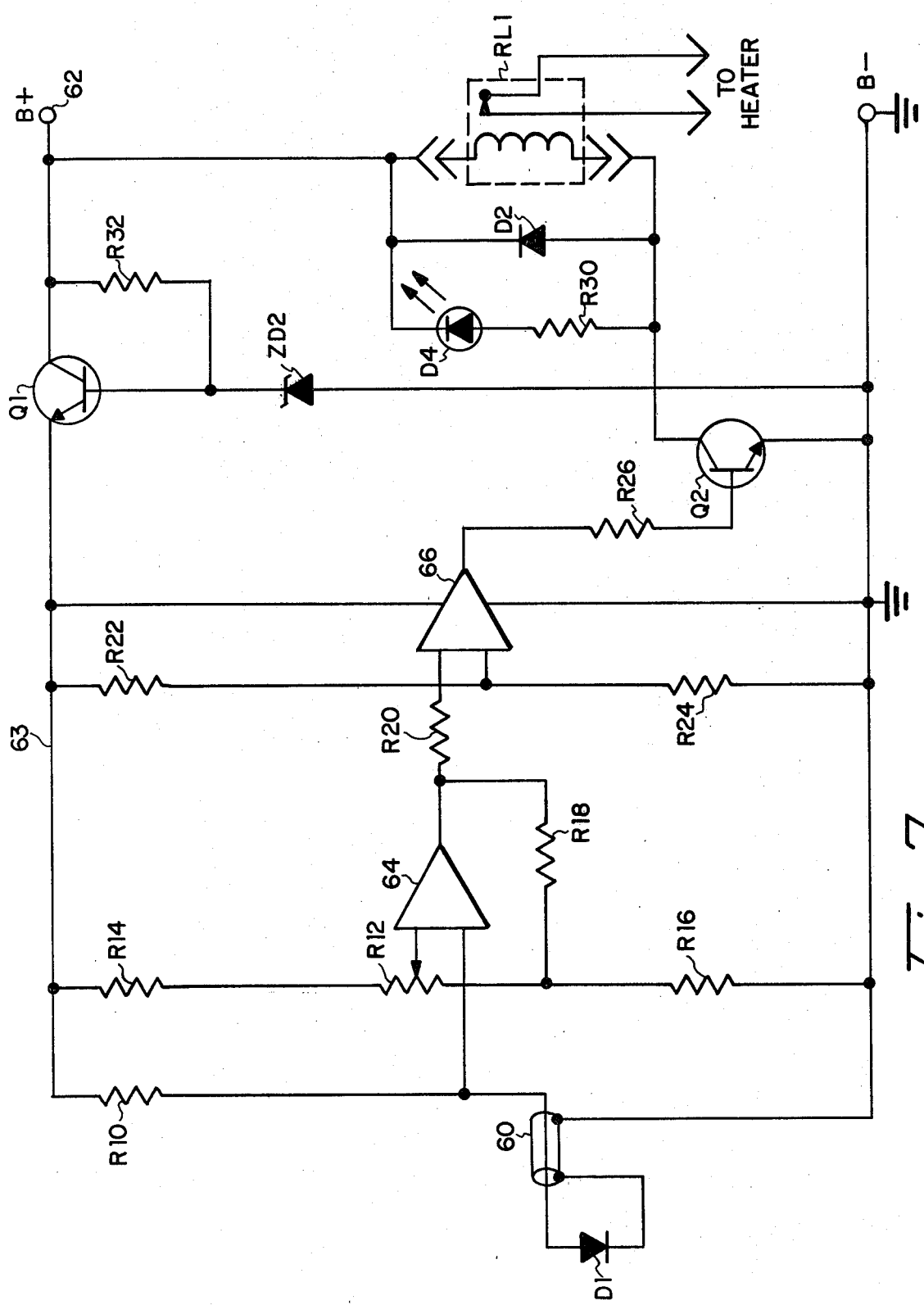
FIG. 2 is a schematic diagram of yet another embodiment of the temperature sensing and switching means of this invention.

Referring now to FIG. 2, a schematic diagram of another embodiment of the temperature sensing and switching means of this invention is illustrated in greater detail. Diode D1 is disposed at one end of a coaxial cable 60, which diode is immersed in the water of the spa 10 such as the heat sensing bulb 42 (FIG. 1). The anode of the diode D1 is coupled to a source of positive voltage through a resistor R10 and a control transistor Q1 to a B+ terminal 62. The cathode terminal of the diode D1 is coupled to the shielding of the cable 60 which shielding is coupled to ground potential. The anode of the diode D1 is coupled to one input terminal of a comparator 64. The second input terminal of the comparator 64 is coupled to the operating arm of a potentiometer R12 which potentiometer is a part of a voltage divider network between the voltage supply line 63 and ground potential. In particular, the voltage divider network is made up of a resistor R14 coupled between one side of the potentiometer R12 and the positive voltage source, and a second resistor R16 coupled between the second side of the potentiometer R11 and ground potential. At the junction between the resistors R12 and R16 a feedback resistor R18 is coupled to the output terminal of the comparator 64.

The output terminal of the comparator 64 is coupled to one input terminal of a second comparator 66 through a resistor R20. The second terminal of the comparator 66 is coupled to voltage divider network comprising resistors R22 and R24. The output of the comparator 66 is coupled to the base terminal of a transistor Q2 through a resistor R26. The emitter terminal of the transistor Q2 is coupled to ground potential and the collector terminal thereof is coupled to one side of a relay RL1.

At this juncture of the description it is noted that the relay RL1 is a substitute for the switch 38 as described in FIG. 1 hereinabove. The second side of the relay RL1 is coupled to the B+ terminal 62. A diode D2 is coupled in parallel with the operating coil of relay RL1 also coupled in parallel with the operating coil of the relay RL1 is a light emitting diode D4 and a resistor R30 coupled in series. The light emitting diode D4 performs the same function as indicating means 48 as described hereinabove.

The collector terminal of the transistor Q1 is coupled to the B+ terminal 62 and the emitter terminal thereof is coupled to the positive supply side of the circuit on a line 63. The base terminal of the transistor Q1 is coupled to the collector terminal thereof through a resistor R32. Also, the base terminal of the transistor Q1 is coupled to the cathode of a zener diode ZD2, and the anode terminal thereof is coupled to ground potential. The zener diode ZD2 and the transistor Q1 are disposed for voltage regulation.

The operating and normally closed contact terminals of the relay RL1 are coupled in series with the series electrical circuit described hereinabove (FIG. 1) comprising the gas valve 26 the thermocouple 34 the pressure switch 36.

In operation, the operating arm of the potentiometer R12 is set at a prescaled setting corresponding to a desired temperature level of the spa. When the diode D1 is immersed in the water of the spa a voltage is developed thereacross. Changes in temperature of the water will change the voltage drop across the PN junction of the diode D1. By prescaling the value of resistor R12 in combination with the operating range of the diode D1 it may be appreciated that comparator 64 is turned on when the voltage from the diode D1 corresponds with the setting of the potentiometer R12 thereby providing an output signal therefrom which signal is coupled to one input terminal of the comparator 66. The voltage divider network comprising the resistors R22 and R24 are likewise preset at an optimum value such that when the output signal from the comparator 64 reaches the desired level the comparator 66 is turned on which activates the transistor Q2. Turning transistor Q2 on completes the circuit path between ground potential and B+ side on terminal 62 so as to operate the relay RL1 opening the contacts thereof. In a similar manner, opening the contacts of the relay RL1 by completing the circuit path through transistor Q2 turns on the light emitting diode D4 to provide a ready signal for those who want to partake of the spa.

We claim:

1. In a water heating apparatus for heating water in a spa and having a heating means coupled to a source of energy through an energy switch wherein water is moved through a line from the spa to close proximity of the heating means by means of a pump wherein the improvement comprises:
   (a) a switching means having an operating arm, and contact terminals thereof, said switching means being disposed for operating said energy switch;
   (b) a heat sensing bulb containing a heat expanding fluid therein being immersed in the spa water;
   (c) a mechanical transducer fluidically coupled to said heat sensing bulb by means of a capillary tube wherein the piston of said transducer is mechanically coupled to an operating arm of said switching means; and
   (d) means for adjusting the position of the operating arm of said switching means disposed so as to change the switching point of said switching means, said means for adjusting being located at the spa.

2. An apparatus as claimed in claim 1 further characterized by an electrically operable indicating means connected in parallel with said switching means.

3. In a gas-fired water heating apparatus for heating water in a spa and having a gas burner coupled to a source of gas through a gas valve wherein a pressure switch is disposed in a water line from the spa to a pump moving the water in proximity to the gas burner, and having a series electrical circuit formed of a gas valve, a pressure switch and a thermocouple, wherein the improvement comprises:
   (a) a switching means having an operating arm, a common and normally closed terminals thereof, said switching means being disposed for interrupting the series electrical circuit;
   (b) a heat sensing bulb containing a heat expanding fluid therein being immersed in the spa water;
   (c) a mechanical transducer fluidically coupled to said heat sensing bulb by means of a capillary tube wherein the piston of said transducer is mechanically coupled to an operating arm of said switching means; and
   (d) means for adjusting the position of the operating arm of said switching means disposed so as to change the switching point of said switching means, said means for adjusting being located at the spa.

4. An apparatus as claimed in claim 3 further characterized by switching means further having a normally open terminal, an electrically operable indicating means having one terminal coupled to said normally opened terminal and a source of low voltage coupled between the common terminal of said switching means and the second terminal of the indicating means.

* * * * *

Disclaimer 4,385,724.—*Larry R. Ramsauser* and *Ronald M. Scholer*, both of San Jose, Calif. APPARATUS FOR CONTROLLING THE WATER TEMPERATURE OF A SPA. Patent dated May 31, 1983. Disclaimer filed Dec. 21, 1984, by the assignee, *Ramco Manufacturing, Inc.*

The term of this patent subsequent to Sept. 20, 1984, has been disclaimed.
[*Official Gazette August 27, 1985.*]